(12) United States Patent
Akkermans (10) Patent No.: US 10,631,463 B2
(45) Date of Patent: *Apr. 28, 2020

(54) BALER AND METHOD OF BALING

(71) Applicant: KUHN-GELDROP BV, AA Geldrop (NL)

(72) Inventor: Dionisius Cornelis Maria Akkermans, PE Roosendaal (NL)

(73) Assignee: KUHN-GELDROP BV, AA Geldrop (NL)

( * ) Notice: Subject to any disclaimer, the term of this patent is extended or adjusted under 35 U.S.C. 154(b) by 966 days.

This patent is subject to a terminal disclaimer.

(21) Appl. No.: 14/914,540

(22) PCT Filed: Aug. 19, 2014

(86) PCT No.: PCT/EP2014/067639
§ 371 (c)(1),
(2) Date: Feb. 25, 2016

(87) PCT Pub. No.: WO2015/028351
PCT Pub. Date: Mar. 5, 2015

(65) Prior Publication Data
US 2016/0198634 A1    Jul. 14, 2016

(30) Foreign Application Priority Data

Aug. 29, 2013 (GB) .................................. 1315396.0

(51) Int. Cl.
*A01F 15/14* (2006.01)
*A01F 15/08* (2006.01)
(Continued)

(52) U.S. Cl.
CPC ........ *A01F 15/0825* (2013.01); *A01F 15/042* (2013.01); *A01F 15/14* (2013.01); *A01F 15/145* (2013.01); *B65B 63/02* (2013.01)

(58) Field of Classification Search
None
See application file for complete search history.

(56) References Cited

U.S. PATENT DOCUMENTS 2,589,083 A * 3/1952 Hill .......................... A01F 15/14
100/21
2,872,860 A * 2/1959 Smith .................... A01F 15/145
100/22
(Continued)

FOREIGN PATENT DOCUMENTS

WO    2013/017229 A1    2/2013
WO    WO 2013017229 A1 *    2/2013    ......... A01F 15/0825

OTHER PUBLICATIONS

International Search Report dated Nov. 14, 2014 for PCT/EP2014/067639 filed on Aug. 19, 2014.

*Primary Examiner* — Adam J Eiseman
*Assistant Examiner* — Bobby Yeonjin Kim
(74) *Attorney, Agent, or Firm* — Oblon, McClelland, Maier & Neustadt, L.L.P.

(57) ABSTRACT

A baler apparatus includes a baling chamber including at least one adjustable wall for adjusting compression of a body of bale material. A reciprocating plunger is operable to compress the bale material and a binding device binds the compressed material to form a bale by use of twine loops. An adjustment mechanism including a guide or rollers varies a length of the twine loops when binding the bale to reduce compression within part of the body of bale material and avoid twine breakage that can otherwise occur as a bale is ejected from the baler.

14 Claims, 6 Drawing Sheets

(51) Int. Cl.
*A01F 15/04* (2006.01)
*B65B 63/02* (2006.01)

(56) References Cited

U.S. PATENT DOCUMENTS

| | | | | |
|---|---|---|---|---|
| 4,088,068 A | * | 5/1978 | White | A01D 85/002 100/3 |
| 4,234,219 A | * | 11/1980 | Vansteelant | A01F 15/145 289/2 |
| 4,309,051 A | * | 1/1982 | Vansteelant | A01F 15/145 289/14 |
| 4,310,186 A | * | 1/1982 | Vansteelant | A01F 15/145 289/14 |
| 4,455,930 A | * | 6/1984 | Crawford | A01F 15/14 100/172 |
| 4,577,553 A | * | 3/1986 | Weidemann | A01F 15/14 100/4 |
| 2006/0237576 A1 | * | 10/2006 | Naaktgeboren | A01F 15/14 242/417.3 |
| 2011/0023731 A1 | * | 2/2011 | Matousek | A01F 15/0825 100/35 |
| 2011/0052363 A1 | * | 3/2011 | Brexel | B65B 9/15 414/798.2 |
| 2012/0211979 A1 | * | 8/2012 | Schumacher | A01F 15/145 289/2 |
| 2013/0047867 A1 | * | 2/2013 | Van De Laarschot | B30B 9/3021 100/7 |
| 2014/0041339 A1 | * | 2/2014 | Borrelli | B65B 63/02 53/438 |
| 2014/0224135 A1 | | 8/2014 | Van Amstel | |

\* cited by examiner

BALER AND METHOD OF BALING

The present invention relates to a baler and a method of baling, in particular but not exclusively for baling an agricultural crop.

BACKGROUND TO THE INVENTION

For efficient transport and storage, and to improve the keeping properties of the product, agricultural products like hay, straw and silage may be compressed into bales of a parallelepiped shape, which are known as 'square' bales. After the compression of the bale material the shape and the compression of the bale is maintained by binding the bale with twines that are looped around the compressed bale material. The ends of the twine are then knotted together.

Typically, compression of the bale material is performed by a reciprocating plunger press baler. A typical baler of this type is described in U.S. Pat. Nos. 4,074,623 and 4,142,746 to Hesston Corporation. This baler machine includes a baling chamber comprising an open-ended channel through which bale material is forced by a reciprocating plunger. The plunger is driven in a substantially linear direction between two end positions comprising respectively a withdrawn position in front of the baling chamber and an extended position in which it extends into the baling chamber. When the plunger is in the withdrawn position the baling chamber is loaded with the bale material to be compressed. The plunger is then driven into the baling chamber so that this new material is compressed against a body of compressed material already in the baling chamber. Any newly compacted material that is added to the already compacted material in the chamber is called a 'wad'. The friction of the compressed material with the walls of the baling chamber provides a resistive force allowing for compression of the new material that is introduced into the baling chamber in front of the plunger.

After compression, the newly compressed material and the compressed material already in the baling chamber are moved together towards the outlet end of the channel until the plunger reaches its fully extended end position. The plunger then moves in the opposite direction toward its withdrawn position so that the baling chamber can be reloaded with new material to be compressed.

The friction within the baling chamber between the already formed bale and the walls of the channel can be regulated for instance by pressing the side walls and/or the top panels of the baling chamber against the compressed material with different levels of force.

The bale is held in compression after leaving the machine by binding the bale with twines that are tied around the body of compressed material. In some machines, a single spool process is used in which each binding is formed with twine that is taken from a single spool and looped around the entire circumference of the bale, then tied with a single knot. Such a process is described in U.S. Pat. No. 3,895,571, which includes a mechanism for releasing the tension in the twine during knotting so as to avoid problems while knotting the twine.

Another example of a machine that uses a single spool process is described in EP0392627A.

This machine includes a mechanism for reducing the bale pressure at the start of the bale forming process to allow the binding twine to slide more easily between the bale material and the previously formed bale that is still in the baling chamber.

Another machine that uses a single spool process is described in DE4031695A. This machine includes a mechanism for reducing the bale pressure at the start of the twine knotting process to allow the binding twine to be knotted more easily.

Other baling machines use a twin spool process in which each binding is formed using twines from two spools, which are tied with two knots at opposite ends of the bale. One advantage of the twin spool process is that the bale can be compressed to a higher compaction pressure because the twine does not have to be passed between the newly compacted bale and the previously formed bale. However, this increased compacting pressure also increases the risk of the twines breaking when the bale is ejected from the baling chamber. The twin spool binding process will now be described in more detail.

At the start of the baling process two lengths of twine from spools on opposite sides of the baling chamber are connected to one another by tying the ends of the twines together.

As the bale material is compacted in the baling chamber the spools feed twine to the baling chamber on either side of the bale material. On one side of the baling chamber the twine passes through the tip of a baling needle. When the body of bale material has reached its full length, between two successive compressing strokes, the needle brings the twine as a loop to the other side of the baling chamber. A knotter device then knots the twine, joining an end of the twine loop that was brought around the compressed bale by the needle to an end of the twine that was supplied by the spool on other side of the baling chamber (on the same side as the knotter). A second knot is also formed for the start of the next bale. The needle is then retracted and a new bale is started.

The pressure applied to the material in the baling chamber during the compression stroke is typically 3 to 4 bar for a bale with a typical compression surface of 90*120 cm. The knotted twine used in this type of baling machine typically has a breaking strength of 200 kgf. Six knotted twines can therefore hold about 6*2*200=2400 kgf. In a conventional bale with a compression surface of 90*120 cm this results in a holding pressure of only 0.22 bar. This places an upper limit on the compression pressure that can be applied to the bale. If a higher compression level is to be maintained, more binding twines have to be used.

There is generally some expansion of the bale as it is ejected from the channel of the baling chamber and this expansion has to be taken into account when designing the baling machine to ensure that the twines are able to maintain the compression of the bale without breaking. However, the amount of expansion is not uniform. Some materials such as dry straw and grass are more elastic than others and tend to expand more. There is therefore a greater risk that the twines will break when baling such materials.

To reduce the risk of breakage when baling highly elastic bale materials, in praxis the overall compression level is sometimes reduced. However, this reduces the density and mass of the bale, which is generally undesirable.

Alternatively, the twine loops tied around the compressed material can be made by design slightly longer than the circumference of the compressed bale while it is in the baling chamber. Then, when the bale leaves the baling chamber it expands to a size determined by the slightly greater length of the twine. Due to this expansion, the pressure in the bale falls to a value that can be withstood by the twines. However, this also has a negative impact on the mass and density of the bale and it results in a lower level of compression for all materials, including less elastic materials for which a lower level of compression is not needed.

Recently, the compression level that can be produced by baling machines that use the twin spool process has increased to typically about 6-10 bar, but the holding strength of the twine has hardly improved. The increased compression level places greater stress on the baling twines, particularly when binding materials that are relatively elastic, for example dry grass. We have found that with some materials and/or in certain weather conditions the pressure after expansion of the bale can be higher than the twines can withstand. As a result, we have found that the twines can break and the bales can then burst during or after leaving the baling chamber.

Attempts to reduce the problem described above have been described in U.S. Pat. No. 4,577,553 which includes a mechanism for increasing the length of the twine loops so that they are less likely to burst, particularly when using sisal twine. However this invention does not describe any possibility to adjust the increase of loop length in relation to the expansion of the material. Furthermore, it is complicated and not reliable since the hook for pulling extra twine length has to grab the twine from the bale, while the position of the twine on the bale can vary widely.

Another attempt to address the problem is described in WO 2013017229. In praxis it shows that this method under certain field and material conditions is difficult to adjust and gives poorly shaped bale ends and sometimes overly dense bales because the last part of the bale is compressed at a lower level.

SUMMARY OF THE INVENTION

It is an object of the invention to provide a baler and a method of baling that mitigate the problems identified above and, in particular, that allow optimum and constant compression of all bale materials and compensate for differences in the elasticity of those materials, while reducing the risk of twine breakage.

According to one aspect of the present invention there is provided a baler apparatus according to claim 1 including a baling chamber comprising a channel having an inlet end and an outlet end, a reciprocating plunger adjacent the inlet end of the baling chamber that is operable to compress a body of bale material within the baling chamber, and a binding device for binding the compressed body of bale material to form a bale, wherein the baling chamber has at least one adjustable wall for adjusting the compression of the body of bale material by controlling the pressure applied to the body of bale material during formation of a bale, the apparatus being further provided with adjustment means for varying, preferably increasing, the length of the twine loops at binding of the bale to adjust the expansion force within part of the body of bale material, to the holding force of the twine loops.

By adjustably varying the loop length of the twine at least just before and during the knotting process, the tension of the binding twine after the bale leaves the baling chamber can be controlled as required, thereby reducing the risk of breakage if the bound bale expands either on leaving the baling chamber or subsequently. The tension in the baling twine can then be controlled according to the nature of the bale material. For example, the increase of twine loop length can be greater if the bale is made of relatively elastic material such as dry grass, or lower if the bale is made of less elastic material.

The bale weight and density can therefore be maintained at a high level, without increasing the risk of the bale bursting and without reducing the compression force in the last part of the bale.

Preferably, the apparatus is configured to increase the loop length of the twine by 10-15 cm from its regular length. The twine loop length increase can be varied according to factors such as the type of bale material and environmental conditions.

Preferably the increase of loop length is formed by guiding the twine over an adjustable roller or guide preferably at the top part of the bale and preferably positioned outside of the twine loop, preferably near to the binding device. Such an arrangement is a simple design with no active elements, i.e. passive parts that have little risk of malfunctioning.

Preferably the increase of the individual twine loops can be adjusted per twine loop, preferably the twines more to the left and right side of the bale will have more loop length increase as these twines will have to withstand more expansion force than the ones in the middle of the bale. Preferably this extra loop length increase is 1-3 cm relative to the inner twines.

Preferably the roller/guide for increasing the loop length is easily displaceable/removable for servicing the binding device and for re-routing the twine after breakage of a twine.

Preferably the roller/guide for increasing the loop length is fixedly but adjustably connected to the baler.

Preferably the increase of the loop length can be achieved by positioning the binding device relatively further from the bale when the twine loop is formed. This arrangement is advantageous because no extra parts are required that could obstruct the material flow.

According to another aspect of the invention there is provided a method of baling bale material in a baler apparatus having a baling chamber including a channel with an inlet end and an outlet end, a reciprocating plunger adjacent the inlet end of the baling chamber, and a binding device, the method comprising activating the reciprocating plunger to compress a body of bale material in the baling chamber and use of at least one adjustable means for varying, preferably increasing the twine loop length at least during the closing of the loop, to form a bale. The twine loop length is determined as a function of the bale material and associated conditions.

DETAILED DESCRIPTION OF A PREFERRED EMBODIMENT

Figure 1:
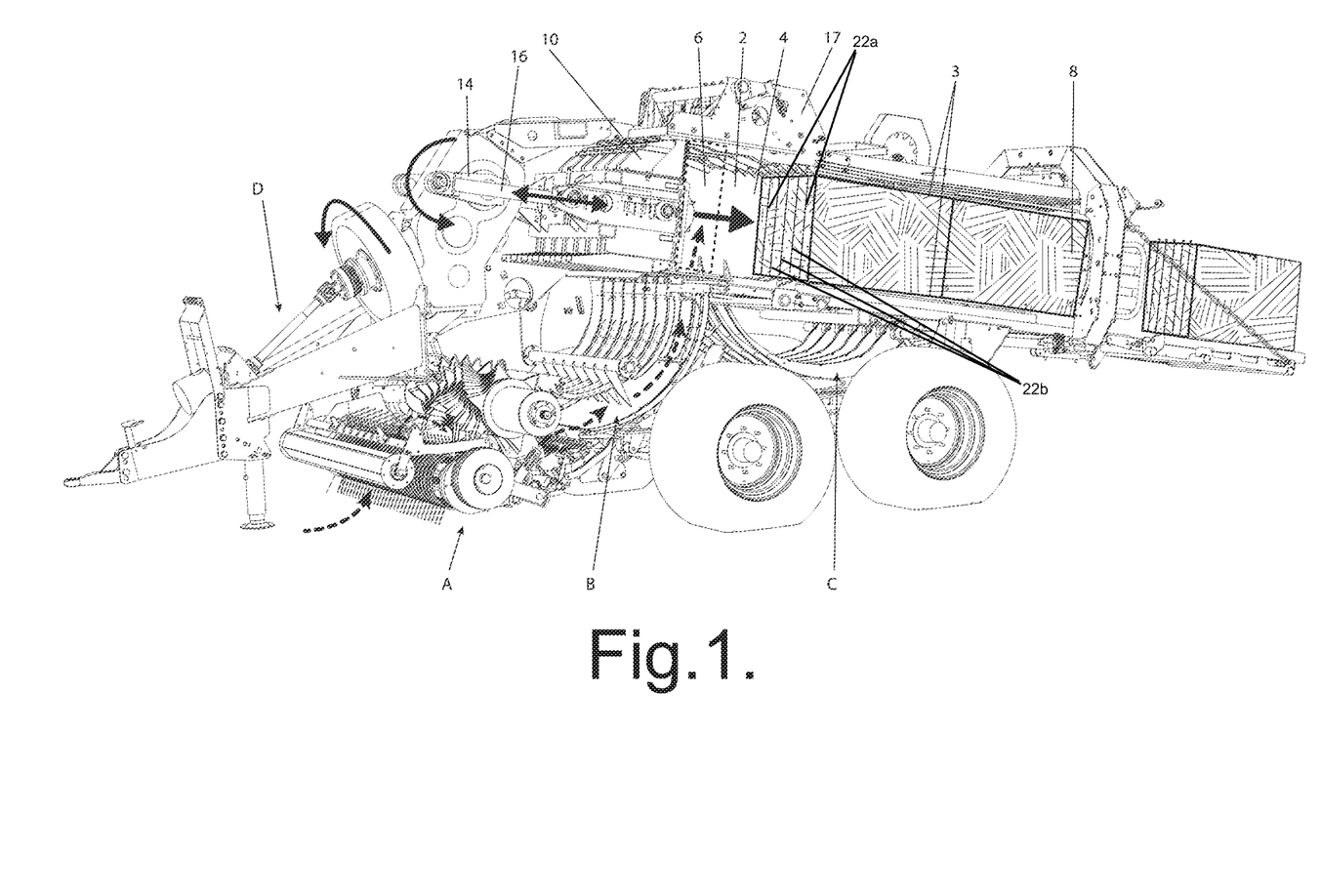
FIG. 1 is an isometric view showing the main components of a baling machine.

The baling machine or baler shown in FIG. 1 includes a baling chamber 2 that is defined by top and bottom plates 3 and two side walls 4, one of which has been omitted from the drawing to show the interior of the chamber 2. The baling chamber 2 comprises a channel having an inlet end 6 and an outlet end 8. At the inlet end 6, the channel is closed by a plunger 10 that can be driven into the baling chamber 2 in a reciprocating manner. In this example, the plunger 10 is driven from a rotating drive axle 12 via a pair of drive arms 14, 16. The baling machine also includes a binding device 17, for example as described in U.S. Pat. No. 4,074,623, for binding the bale with binding twine.

In addition, the baling machine includes a pick up mechanism A for picking up cut bale material (for example grass and straw) from the ground, a feed mechanism B for feeding the bale material into the baling chamber 2, a set of needles C for feeding binding twine through the baling chamber and a drive mechanism D for transmitting drive to the drive axle 12 from the drive output of a towing vehicle (not shown). These components are all conventional and so will not be described in detail.

Figure 2A:
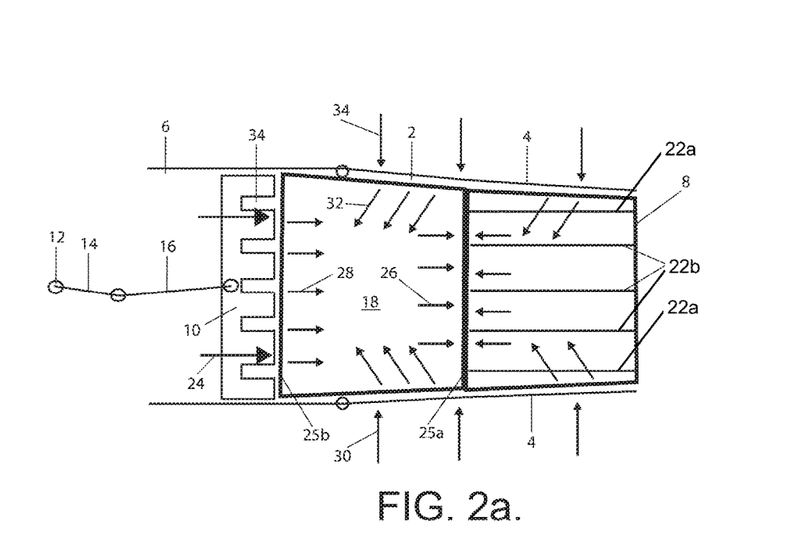
FIG. 2a is a schematic illustration plan view of a prior art baling machine during compression of the bale material.
Figure 2B:
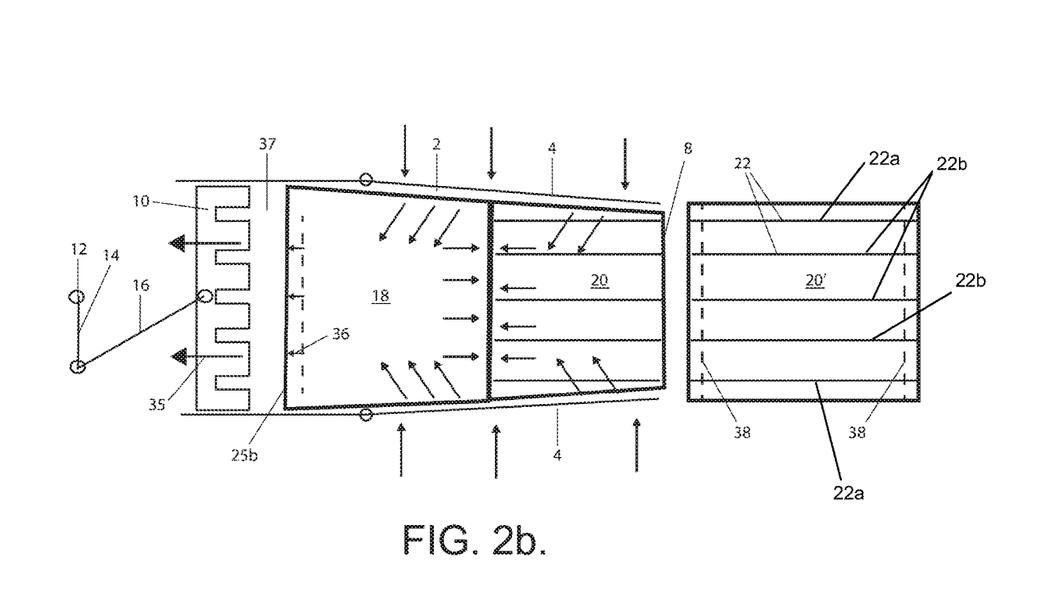
FIG. 2b is a schematic illustration plan view of the prior art baling machine after withdrawal of the plunger and prior to binding of the bale material.

The prior art baling machine represented schematically in FIGS. 2a and 2b is substantially as described in U.S. Pat. No. 4,074,623, the contents of which are understood by a skilled person and incorporated herein by reference. The baling machine includes a baling chamber 2 that is defined by two side walls 4, as well as by top and bottom plates (not shown in FIGS. 2a and 2b, but denoted 3 in FIG. 1). The opposed side walls 4 are inclined towards one another to provide a tapered channel and can be adjusted to different degrees of taper. The baling chamber 2 thus consists of a channel having an inlet end 6 and an outlet end 8. At the inlet end 6, the channel is closed by a plunger 10 that can be driven into the baling chamber 2 in a reciprocating manner. In this example, the plunger 10 is driven from a rotating drive axle 12 via a pair of drive arms 14, 16.

The baling machine of FIGS. 2a and 2b is shown in operation, containing within the baling chamber 2 a compressed but unbound body 18 of bale material and a compressed and bound bale 20. The completed bale 20 is bound with binding twine 22. In this example, five loops of binding twine 22 are used, which extend around the top, bottom, front and rear faces of the bale 20.

In FIG. 2a the baling machine is shown during a compression stroke, in which the plunger 10 is driven forwards as depicted by arrows 24 into the baling chamber 2. As a result of this movement of the plunger 10, a body 18 of bale material that has been loaded into the baling chamber 2 is driven forwards within the baling chamber 2 against the end face of the already formed bale 20. The body 18 of bale material is thus compressed both longitudinally and transversely: longitudinal compression resulting from being pressed by the plunger 10 against the end face of the already formed bale 20 (and from the frictional forces acting on the bale 20), and transverse compression of the body 18 resulting from it being forced between the converging side walls 4. The frictional force on the body 18 of bale material can be regulated by adjusting the positions of the side walls 4 and/or the top and bottom plates as indicated by arrows 30.

During compression, the front and rear faces 25a, 25b of the body 18 of bale material are driven forwards by the plunger 10 as depicted by the arrows 26, 28. The resulting compression of the bale material is indicated by diagonal arrows 32. This process is repeated until the body 18 of bale material has reached the required size.

Once the body 18 of bale material has reached the required size, the bale material is bound with baling twine. A set of needles (not shown in FIGS. 2a and 2b, but denoted C in FIG. 1) carrying the binding twines are extended through slots 34 in the face of the plunger 10 and the twines 22 are then tied around the bale. The binding and knotting processes may for example be substantially as described in U.S. Pat. No. 4,074,623.

After the bale material has been bound, the plunger 10 withdraws as illustrated by arrows 35 in FIG. 2b so that bale material for the next bale can be fed into the baling chamber. As the plunger withdraws, the rear face 25b of the body 18 of bale material recovers slightly and expands a short distance rearward as depicted by arrows 36. This rearward expansion of the body 18 of bale material is limited by the binding twines 22 that have been tied around the body 18 of bale material and increases the tension in the binding twines.

The next bale is then formed by introducing bale material into the gap 37 between the plunger 10 and the rear face 25b of the bale that has just been formed, then compressing the material by reciprocating movement of the plunger 10. This process is repeated as necessary to increase the size of the compressed body of bale material. As the process is repeated, the bale 20 that has just been formed is pushed along the channel towards the downstream end 8 of the baling chamber 2, and the previously formed bale 20' is ejected from the downstream end of the baling chamber 2 onto the ground.

When the bale 20' is ejected from the baling chamber the compressive forces acting on the front and rear faces of the bale are removed, allowing the bale 20' to expand against the tension of binding twines 22. The overall length of the bale 20' therefore increases slightly, the unexpanded size of the bale 20' being indicated by broken lines 38. This increases the tension in the twines 22. As a result of this partial decompression of the bale the load carried by the twines 22 as the bale is expelled from the baling chamber 2 is significantly less than the pressure that was applied to the bale material by the plunger 10 (for example about 0.22 bar as compared to a compacting pressure of 4-10 bar).

Figure 3A:
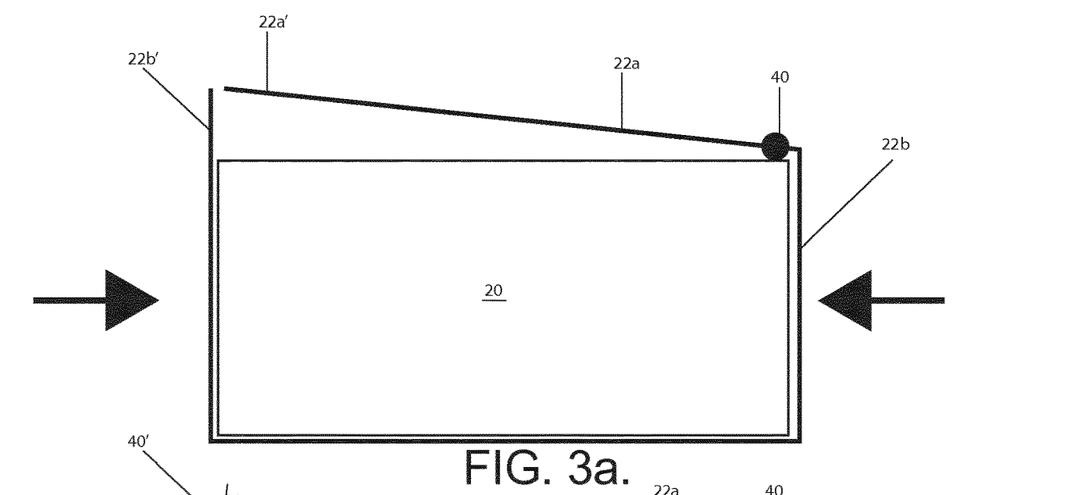
FIG. 3a is a schematic illustration of a prior art bale bound with baling twine, before the ends of the twine are tied.
Figure 3B:
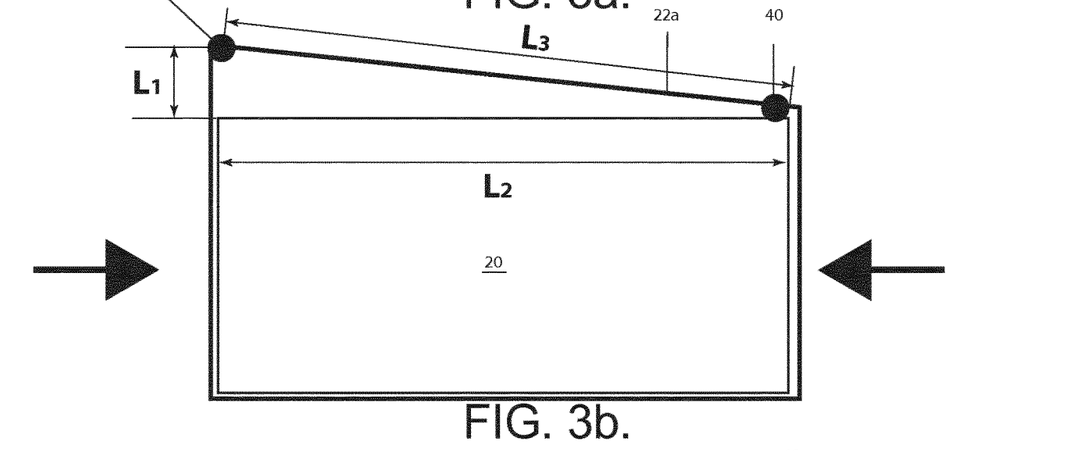
FIG. 3b is a schematic illustration of the prior art bale, after the ends of the baling twine are tied.
Figure 3C:
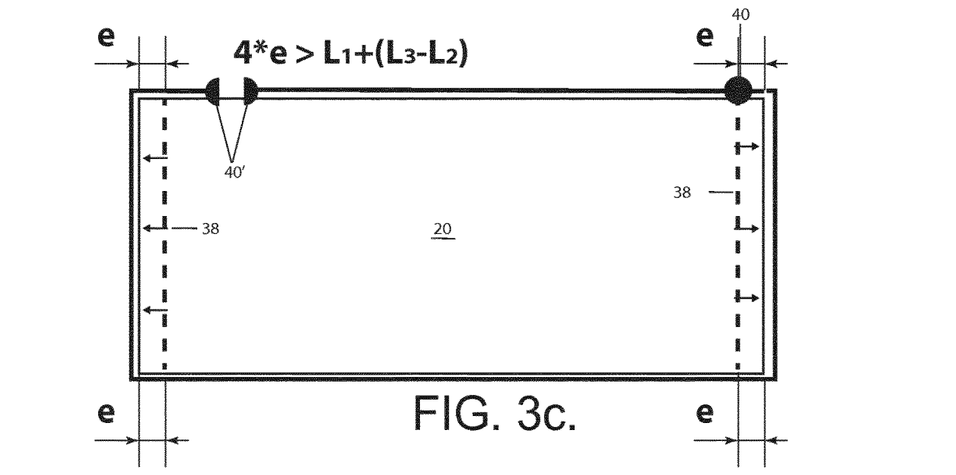
FIG. 3c is a schematic illustration of the prior art bale after the bale has expanded, causing breakage of the baling twine.

The prior art binding process is illustrated again in FIGS. 3a to 3c. In FIG. 3a, the bale 20 is shown in a compressed state, with two twines 22a, 22b forming a loop around the bale. First ends of the twines have been tied together forming a first knot 40. The second ends 22a', 22b' of the twines have not yet been tied together.

In FIG. 3b the bale 20 is shown after the second ends of the twines 22a, 22b have been tied together forming a second knot 40'. An extra length L of twine is required by the binding device, which is released after the knot 40' has been tied. Therefore, when both ends of the twine are released from the binding device the total length of the twine binding increases by L1+(L3−L2), which slightly reduces the tension in the binding.

When the bale 20 is ejected from the baling chamber, both ends of the bale expand by a distance e as shown in FIG. 3c, the original positions of the ends of the bale being depicted by broken lines 38. This causes the circumference of the bale to increase by a length of 4*e. If the increase in circumference is greater than the additional length of twine released by the binding device, that is if 4*e>L1+(L3−L2), the overall tension in the twine binding will increase, which may result in failure of the twine forming the binding at knot 40' or 40.

Figure 4A:
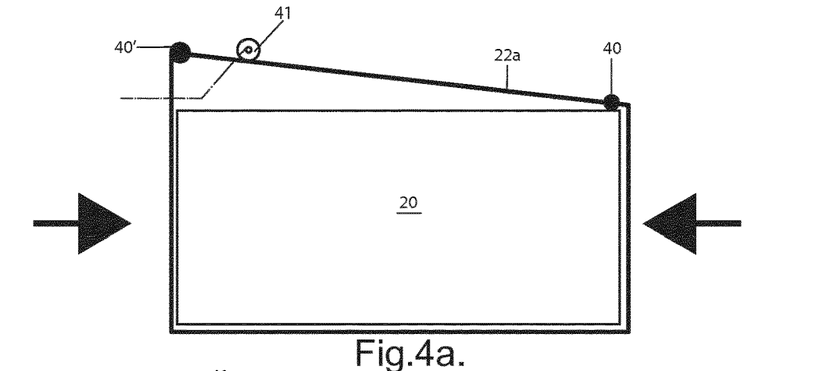
FIGS. 4a to d are schematic illustration of a baling machine according to an embodiment of the invention during closing of the twine loop.
Figure 4B:
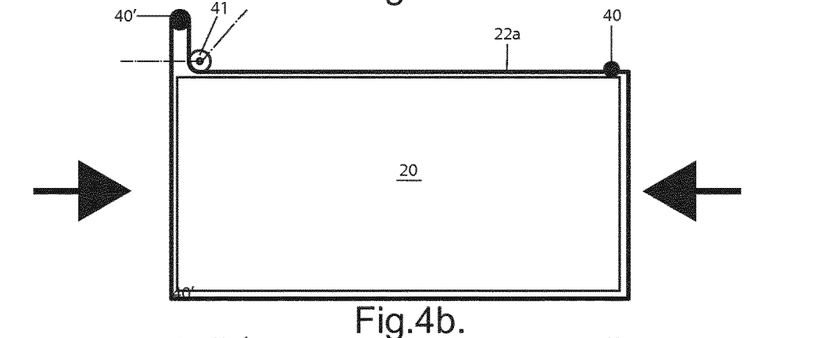
Figure 4C:
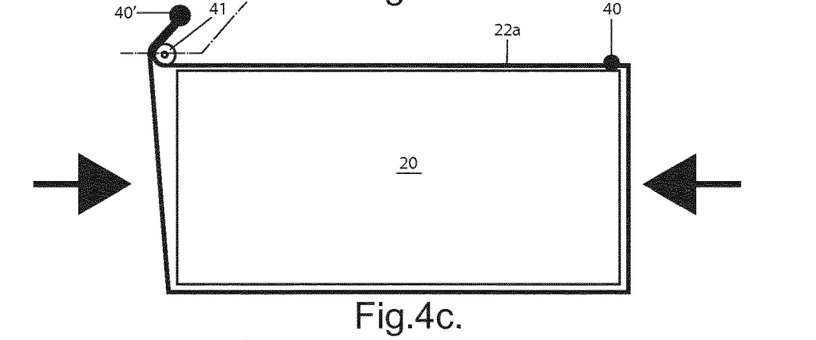

A schematic baling machine according to an embodiment of the invention is shown in FIGS. 4a and 4b. This machine is similar in many respects to the prior art machine shown in FIGS. 1, 2a and 2b and the foregoing description therefore applies in part also to this machine. As in the prior art machine, the side walls 4 (not shown) include adjustable wall sections, each adjustable wall section being mounted for pivoting movement about a pivot joint at the upstream edge of the wall section. An adjuster device is connected to each wall, the adjuster device being operable to adjust the position of the wall and thereby to adjust the frictional force applied to the already-formed bale 20 as it moves through the baling chamber 2. Alternatively or in addition, the adjuster devices may be configured to adjust the positions of the top and/or bottom walls of the baling chamber. The adjuster devices may for example be hydraulically or electrically driven and are controlled by a control device, which can operate automatically or in response to control signals provided by the operator.

According to the invention, a twine loop increasing roller/guide 41 can be adjusted to a position that increases the twine loop length by causing the binding device to spool out more twine to a desired length before a knot 40' is tied. FIGS. 4a to 4d show different adjustment positions so as to adjust the loop length from minimum as shown in 4a to a maximum as shown in 4d.

Figure 4D:
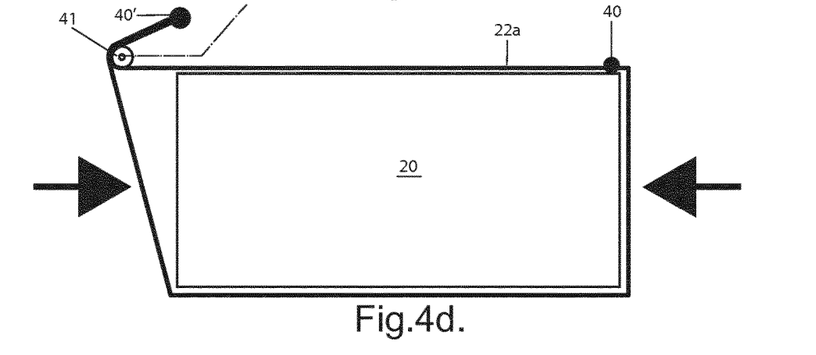

Control over the twine loop length is adjustable so as to adapt the process to the expansion properties of the bale material. For relatively inelastic materials that expand only slightly after compaction (e.g. silage), the required increase will be small (e.g. FIG. 4a or 4b), whereas for more elastic materials that tend to expand a lot after compaction (e.g. dry straw and/or materials that are baled in very dry conditions) the required increase will be substantial (e.g. 10-20 cm at compression levels of 6-10 bar, e.g. 4d).

Figure 5A:
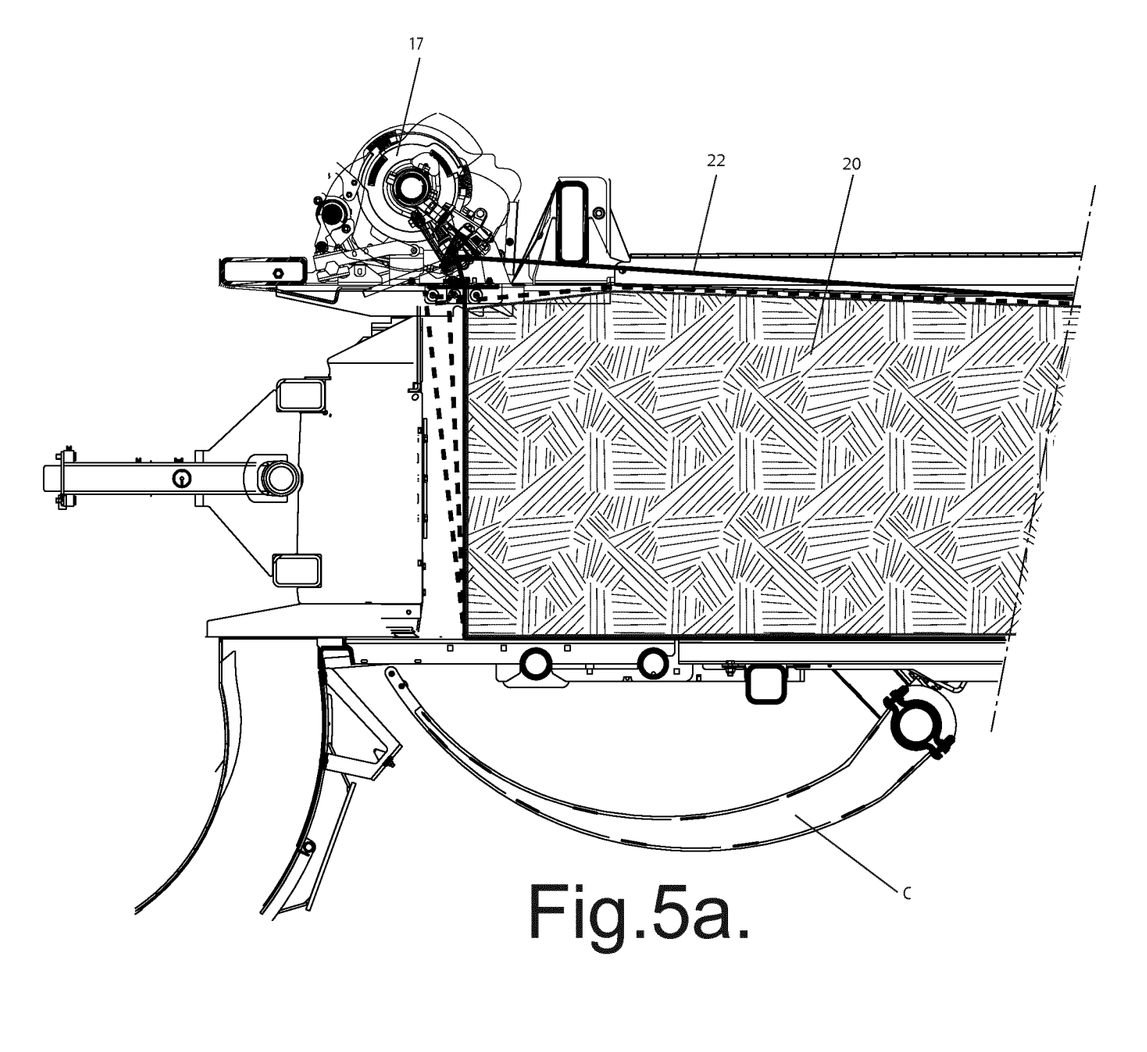
FIGS. 5 and 5b shows the device incorporated in the design of a baler.
Figure 5B:
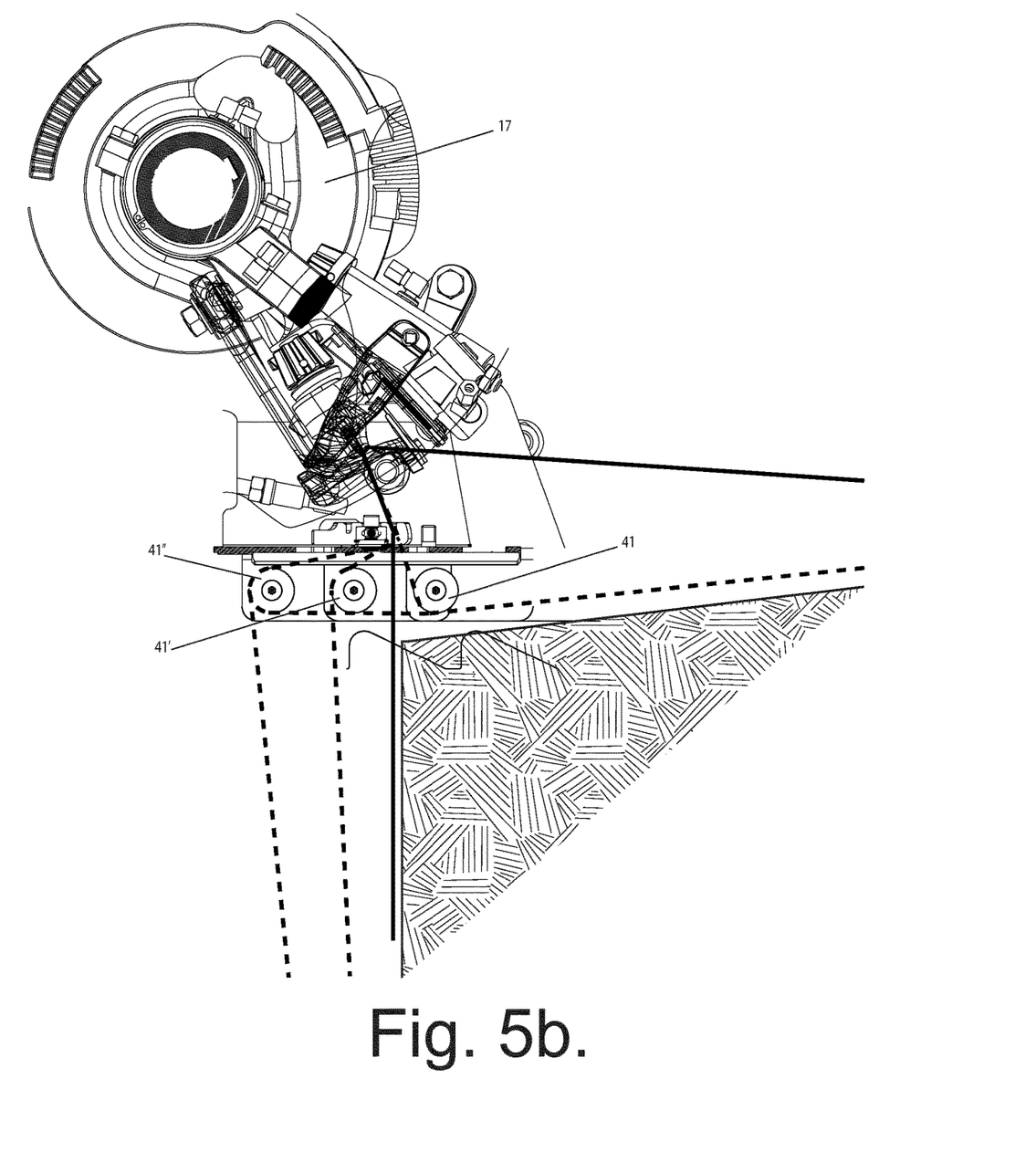

FIGS. 5a and 5b illustrate an adjustable loop mechanism, according to the invention, in position in a baler. A roller 41 is arranged to be adjusted to a number of different positions 41', 41" in practice which causes more twine to be drawn from a spool (not shown) before a knot is tied to secure the twine about a circumference of the bale 20. The extent of the lengthened position is determined by the material or other environmental conditions either sensed automatically or activated by manual input settings.

The basic configuration of the invention is intended to adjust multiple twine loops (there are five in the illustrated prior art) to the same length. However, the invention could be configured to provide different twine loop lengths for the same bale if this were desirable. In other words a series of rollers 41 would be adjused independently of one another. In one form the outermost twine loops (on the left and right sides of the bale respectively) could be adjusted to have greater loop length.

Although the description is based on a double tie knotter (knotting two knots 40 and 40' in the loop) the principle of adjustment of the twine loop length will also be effective on a single tie knotter baler (with only knot 40' in the loop).

The invention claimed is:

1. A baler apparatus comprising:
    a baling chamber including a channel including an inlet end and an outlet end and at least one adjustable wall adjusting compression of a body of bale material by controlling pressure applied to the body of bale material during formation of a bale;
    a reciprocating plunger adjacent to the inlet end of the baling chamber operable to compress the body of bale material within the baling chamber;
    a binding device binding the compressed body of bale material within the baling chamber to form a bale by use of twine loops; and
    an adjustment device varying an increase in a length of the twine loops at binding of the bale to reduce compression within part of the body of bale material when the bale is ejected from the baling chamber,
    wherein the adjustment device is operable to adjust the increase in the length of the twine loops in response to factors including a type of bale material and environmental conditions.

2. The baler apparatus of claim 1, wherein the adjustment device includes a movable roller or guide.

3. The baler apparatus of claim 2, wherein the movable roller or guide is locatable for engagement against an outside of the twine loop.

4. The baler apparatus of claim 2, wherein the movable roller or guide is located adjacent a binding device.

5. The baler apparatus of claim 1, wherein the binding device is configured to close the twine loop with one single knot.

6. The baler apparatus of claim 1, wherein the binding device is configured to close the twine loop with two knots.

7. The baler apparatus of claim 1, wherein the adjustment device is configured to independently vary the length of individual twine loops.

8. The baler apparatus of claim 7, wherein the twine loops comprise outermost twines and innermost twines, and wherein the outermost twines can be adjusted to have greater loop length compared to the innermost twines.

9. The baler apparatus of claim 8, wherein an extra loop length increase of the outermost twines is 1-3 cm relative to the innermost twines.

10. The baler apparatus of claim 1, wherein the adjustment device is configured to increase loop length of a twine by up to 25 cm.

11. The baler apparatus of claim 1, wherein the adjustment device is easily removable or displaceable for at least one of servicing or re-routing the twine after a breakage.

12. The baler apparatus of claim 1, wherein the adjustment device is fixedly but adjustably connected to the baler.

13. The baler apparatus of claim 1, wherein an increase of the loop length can be achieved by positioning a binding device relatively further or at an adjustable distance from the bale when the twine loop is formed.

14. A method of baling bale material in a baler apparatus including a baling chamber including a channel including an inlet end and an outlet end, a reciprocating plunger adjacent the inlet end of the baling chamber, and a binding device, the method comprising:
    activating the reciprocating plunger to compress a body of bale material in the baling chamber; and
    using at least one adjustable element for varying an increase in a twine loop length at least during closing of the loop, to form a bale, the increase in the twine loop length for reducing compression within part of a body of bale material when the bale is ejected from the baling chamber, in response to factors including a type of bale material and environmental conditions.

\* \* \* \* \*